United States Patent
Liu et al.

(10) Patent No.: US 9,210,066 B2
(45) Date of Patent: Dec. 8, 2015

(54) ROUTING METHOD, APPARATUS AND SYSTEM

(75) Inventors: Yongjun Liu, Beijing (CN); Yong Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 348 days.

(21) Appl. No.: 13/273,338

(22) Filed: Oct. 14, 2011

(65) Prior Publication Data
US 2012/0033555 A1    Feb. 9, 2012

Related U.S. Application Data

(63) Continuation of application No. PCT/CN2009/071307, filed on Apr. 16, 2009.

(51) Int. Cl.
| | |
|---|---|
| H04L 12/26 | (2006.01) |
| H04L 12/701 | (2013.01) |
| H04L 12/721 | (2013.01) |
| H04W 40/12 | (2009.01) |
| H04W 40/28 | (2009.01) |
| H04W 40/00 | (2009.01) |

(52) U.S. Cl.
CPC ............... *H04L 45/00* (2013.01); *H04L 45/26* (2013.01); *H04W 40/12* (2013.01); *H04W 40/28* (2013.01); *H04W 40/005* (2013.01)

(58) Field of Classification Search
None
See application file for complete search history.

(56) References Cited

U.S. PATENT DOCUMENTS

| | | | |
|---|---|---|---|
| 5,719,861 A * | 2/1998 | Okanoue | 370/351 |
| 6,028,857 A * | 2/2000 | Poor | 370/351 |
| 2002/0049561 A1* | 4/2002 | Garcia-Luna-Aceves et al. | 702/182 |
| 2004/0103282 A1* | 5/2004 | Meier et al. | 713/171 |
| 2006/0109815 A1* | 5/2006 | Ozer et al. | 370/329 |
| 2006/0120303 A1 | 6/2006 | Yarvis et al. | |
| 2006/0245360 A1* | 11/2006 | Ensor et al. | 370/238 |
| 2007/0165545 A1 | 7/2007 | Dobrowski et al. | |

(Continued)

FOREIGN PATENT DOCUMENTS

| | | |
|---|---|---|
| CN | 1627718 A | 6/2005 |
| CN | 1719803 A | 1/2006 |

(Continued)

OTHER PUBLICATIONS

Written Opinion of the International Searching Authority mailed Jan. 21, 2010 issued in corresponding International Patent Application No. PCT/CN2009/071307.

(Continued)

*Primary Examiner* — Kenny Lin
(74) *Attorney, Agent, or Firm* — Staas & Halsey LLP

(57) ABSTRACT

A routing method and apparatus are provided. The routing method includes the following steps: sending a probe frame that carries an address of a destination node to a neighboring node(s); receiving a response message returned; selecting one neighboring node from the neighboring node(s) that returns the response message as a next-hop node to which data is sent. A neighboring node with a cost parameter which is lower than a cost parameter in a routing table of the destination node is selected as the next-hop node. In the routing method, when a routing node forwards data, the route is found in real time by broadcasting a probe frame, and data may be sent as long as any one of the neighboring nodes that may arrive at the destination node is in an active state, and thus a data transmission delay is shortened.

19 Claims, 4 Drawing Sheets

(56) References Cited

U.S. PATENT DOCUMENTS

| | | | |
|---|---|---|---|
| 2007/0280262 A1* | 12/2007 | Larsen et al. | 370/395.21 |
| 2008/0037562 A1* | 2/2008 | Saleh et al. | 370/400 |
| 2008/0039101 A1* | 2/2008 | Callaway | 455/445 |

FOREIGN PATENT DOCUMENTS

| | | |
|---|---|---|
| CN | 101217497 A | 7/2008 |
| CN | 101309213 A | 11/2008 |

OTHER PUBLICATIONS

Li-guo Wang et al., "Low Power-Consumed Dynamic Routing Protocol of 6LoWPAN", Journal of Beijing Jiaotong University, vol. 30 No. 5, Oct. 2006, pp. 80-83.

Technical Overview of Time Synchronized Mesh Protocol (TSMP) for ZigBee Wireless Sensor Networks (WSN), Document 07059r00ZB, Jan. 2007, pp. 1-13.

Martin Turon et al. "ZigBee Low Power Router Baseline Proposal", Revision 6, Feb. 20, 2008, pp. 1-34.

Chinese Office Action mailed Mar. 1, 2012 issued in corresponding Chinese Patent Application No. 200980123746.9.

Chinese Office Action mailed Jan. 28, 2013 for corresponding Chinese Application No. 200980123476.9.

Chinese Office Action issued on Aug. 2, 2012 in corresponding Chinese Patent Application No. 200980123746.9.

International Search Report, mailed Jan. 21, 2010, in International Application No. PCT/CN2009/071307 (4 pp.).

* cited by examiner

ROUTING METHOD, APPARATUS AND SYSTEM

CROSS-REFERENCE TO RELATED APPLICATIONS

This application is a continuation of International Application No. PCT/CN2009/071307, filed on Apr. 16, 2009, which is hereby incorporated by reference in its entirety.

FIELD OF THE INVENTION

The present invention relates to wireless communication technologies, and in particular, to a routing method, apparatus, and system.

BACKGROUND OF THE INVENTION

In network communication, each routing node creates a routing table. When a routing table of a routing node is initially created, the routing node distributes a route discovery command broadcast that carries an address of a destination node to a surrounding node. After receiving the route discovery command broadcast, the surrounding node queries the address of the destination node, and compares the address of the destination node with its own address information. If the address of the surrounding node is consistent with the address of the destination node, the surrounding node feeds back information about a packet sending path to a node that creates the route along a reverse path. If the address of the surrounding node is inconsistent with the address of the destination node, the surrounding node may record the reverse path to the node that initiates the route query, and forwards the route discovery command broadcast until the route discovery command broadcast arrives at the destination node, and then feeds back the information about the packet sending path to the node that creates the route along the reverse path. In the process of route discovery, more than one piece of routing information may be fed back from the destination node. According to some network performance parameters such as hops or link quality evaluation function accumulation (here referred to as "cost"), a route with the minimum cost is determined according to a certain selection principles, and stored in the routing table.

The routing node may process address information in the packet, and has a function of forwarding data. When receiving a packet, the routing node checks the destination node address in the packet. If the destination node address is in the routing table of the routing node, the routing node forwards the packet to a next-hop node in the routing table; if the destination node address is not in the routing table of the routing node, the routing node decides, according to service requirements, whether to initiate a route discovery process.

A low-power-consumption routing node not only takes on features of an ordinary routing node, but also has a feature of long-term sleep. That is, the low-power-consumption routing node is not always in a working state, but falls into sleep periodically to keep a state of relatively low power consumption.

In the process of implementing the present invention, the inventor of the present invention finds that: In the data transmission in a low-power-consumption routing network, each packet cannot be forwarded until the next-hop low-power-consumption routing node wakes up, which leads to long transmission delay.

SUMMARY OF THE INVENTION

An embodiment of the present invention provides a routing method, apparatus and system to reduce a data transmission delay in a low-power-consumption routing network.

An embodiment of the present invention provides a routing method, including: sending a probe frame that carries an address of a destination node to a neighboring node(s); receiving a response message returned by the neighboring node(s); selecting one neighboring node from the neighboring node(s) that returns the response message as a next-hop node to which data is sent, where a cost parameter of the neighboring node selected as the next-hop node is lower than a cost parameter in a stored routing table of the destination node.

An embodiment of the present invention further provides another routing method, including: receiving a probe frame which carries a destination address and is sent by a sending node; returning a response message that carries a cost parameter of a receiving node when a routing table stored in the receiving node includes the address of a destination node; or, returning the response message when the routing table stored in the receiving node includes the address of the destination node, and an obtained cost parameter of the receiving node is lower than a cost parameter in the stored routing table of the destination node.

An embodiment of the present invention further provides a communication device, including: a sending unit, configured to send a probe frame that carries an address of a destination node to a neighboring node(s); a receiving unit, configured to receive a response message returned by the neighboring node(s); a storage unit, configured to store a routing table of the destination node; and a selecting unit, configured to select one neighboring node from the neighboring node(s) that returns the response message as a next-hop node to which data is sent, where a cost parameter of the neighboring node selected as the next-hop node is lower than a cost parameter in the routing table of the destination node.

An embodiment of the present invention further provides another communication device, including: a receiving unit, configured to receive a probe frame which carries a destination address and is sent by a sending node; a storage unit, configured to store a routing table; a generating unit, configured to: generate a response message that carries a cost parameter of a receiving node if the routing table stored in the storage unit comprises the address of the destination node, or generate the response message if the routing table stored in the storage unit comprises the address of the destination node, and a cost parameter in the routing table stored in the storage unit is lower than an obtained cost parameter in the routing table of the destination node,; and a sending unit, configured to send the response message generated by the generating unit.

It can be known from the foregoing technical solutions that, in the embodiments of the present invention, when a routing node forwards data, the route is found in real time by broadcasting a probe frame, and data may be sent as long as any neighboring node through which the destination node may be reached is in an active state, which shortens the data transmission delay.

BRIEF DESCRIPTION OF THE DRAWINGS

To illustrate the technical solutions in the embodiments of the present invention or in the prior art more clearly, the following outlines accompanying drawings needed for the description of the embodiments or the prior art. Apparently, the accompanying drawings outlined below are merely some embodiments of the present invention, and persons of ordinary skill in the art may derive other drawings from the accompanying drawings without creative efforts.

DETAILED DESCRIPTION OF THE EMBODIMENTS

The technical solutions in the embodiments of the present invention are described clearly and completely in combination with the accompanying drawings in the embodiments of the present invention. Evidently, the embodiments to be described are merely part of rather than all of the embodiments of the present invention. All other embodiments, which may be derived by those of ordinary skill in the art from the embodiments of the present invention without creative efforts, shall fall within the scope of the present invention.

Figure 1:
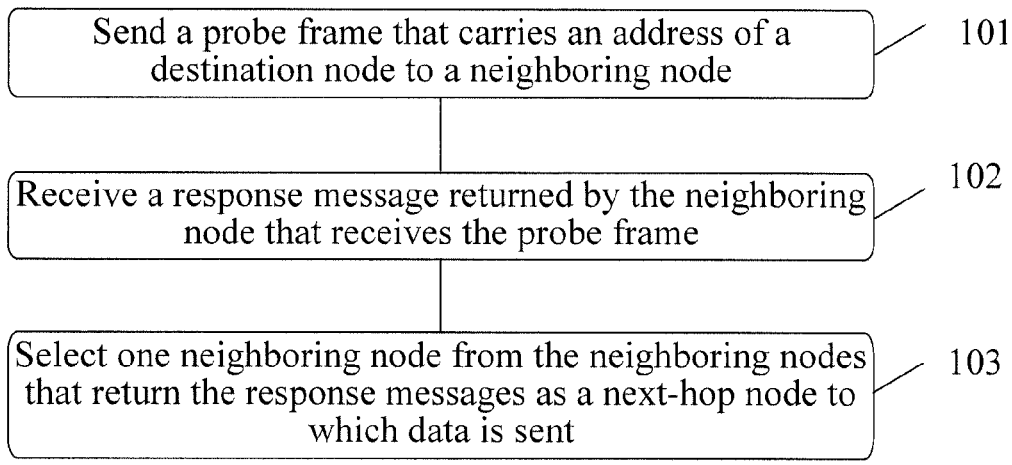
FIG. 1 is a schematic flowchart of a routing method according to an embodiment of the present invention.

FIG. 1 is a schematic flowchart of a routing method according to an embodiment of the present invention. As shown in FIG. 1, the routing method provided in the embodiment of the present invention includes:

101: Send a probe frame that carries an address of a destination node to a neighboring node(s).

102: Receive a response message returned by the neighboring node(s).

After the neighboring node(s) receives the probe frame, if a routing table of the neighboring node(s) includes the address of the destination node, the neighboring node(s) returns a response message.

103: Select one neighboring node from the neighboring node(s) that returns the response message as a next-hop node to which data is sent.

A cost parameter of the neighboring node selected as the next-hop node is lower than a cost parameter in the routing table of the destination node, where the routing table of the destination node is stored in a sending node. That is, the data is transmitted along a path with a gradually decreasing cost.

The determining of the cost parameter of a network node may be completed in a route discovery process. The cost parameter may be hops and/or link quality evaluation function accumulation. In a low-power-consumption route, power consumption and delay are relatively important network performance indices. Average power consumption or average delay may also be introduced as measures of the cost. Further, the foregoing various parameters may be combined to measure the cost. In a general route discovery process, nodes on different paths may store cost parameters of the destination node. Alternatively, the destination node may return multiple route responses along different paths, thus the cost parameters may be stored on multiple paths. Alternatively, the destination node initiates a route discovery command broadcast, and the node that receives the route discovery command broadcast records and forwards only the route discovery command of lower cost. In this way, each node in the network records the cost parameters of the destination node finally. No matter which manner is used to query the route and obtain the cost parameter, each hop may actually have multiple paths to the destination node, and it is essential to select a path with a decreasing cost.

In the embodiment of the present invention, it is unnecessary to specify a specific next-hop address corresponding to each destination node address in the routing table. Instead, the cost parameter is recorded, and the next-hop path is selected in real time according to the cost parameter. Therefore, during data transmission, it is unnecessary to wait for a specific next-hop node to end the sleep and then send the data. The data may be sent through any neighboring node that first ends the sleep. Therefore, a data transmission delay in the low-power-consumption routing network may be reduced. Assume that periodic sleep time of the low-power-consumption router is S, active time is A, and the cost parameter is represented by the hops. There are n hops in total from a source node to the destination node. Therefore, in the prior art, average wait time of sending data at each hop is $S^2/[2(S+A)]$, and a total average delay from the source node to the destination node is $nS^2/[p2(S+A)]$. If the method according to the embodiment of the present invention is used, it is assumed that each hop has two links to the destination node. Because data may be sent as long as any neighboring node is in an active state during every data sending, the average wait time at each hop is $nS^3/[3(S+A)^2]$. Thus, it can be seen that the delay is reduced. If specific numbers are taken as an example for description, it is assumed that S=1000 ms, A=100 ms, and n=12. The average delay in the prior art is 5.45 s while the average delay in this method is 3.30 s only, thus 39% of time is saved. If each hop has more neighboring nodes to the destination node, the average delay is shorter.

The shortening of the average delay means that the router may shorten the wait time, and reduce the sending of the probe frames, and therefore, reduce power consumption and interference on the outside. Moreover, because each hop has multiple links to select, actually robustness is improved and route repair requirements are reduced.

Figure 2:
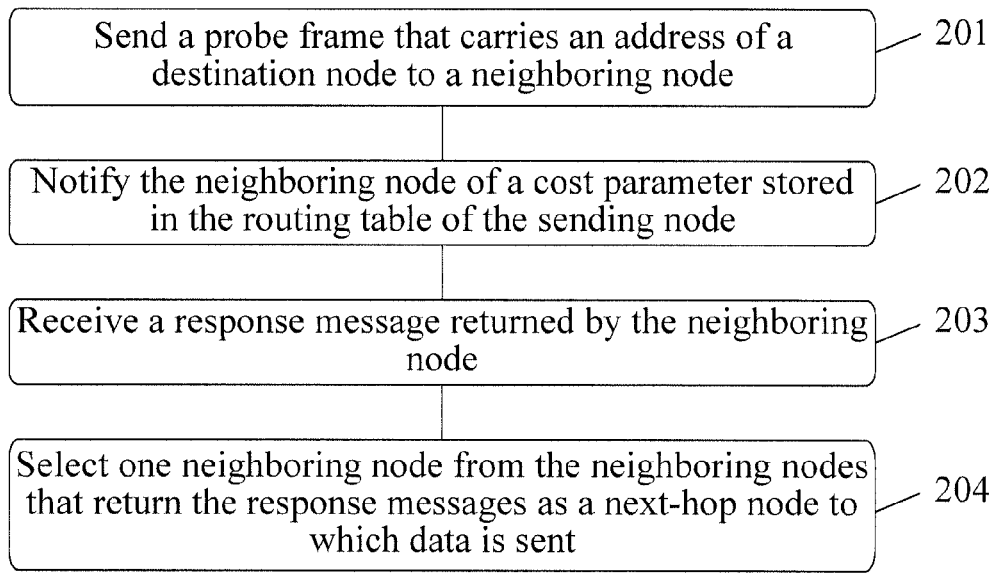
FIG. 2 is a schematic flowchart of another routing method according to an embodiment of the present invention.

FIG. 2 is a schematic flowchart of another routing method according to an embodiment of the present invention. As shown in FIG. 2, the routing method provided in the embodiment of the present invention includes:

201: Send a probe frame that carries an address of a destination node to a neighboring node(s).

When a source node sends a packet, or when an intermediate routing node receives a packet and needs to further forward the packet, the probe frame may be broadcast to the neighboring node(s). In a network that adopts a low-power-consumption routing technique, data may be transmitted between the routing nodes by using an asynchronous mechanism or a quasi-synchronous mechanism. In a wireless network with low-power-consumption routes that adopt the quasi-synchronous mechanism, sleep time sequences of different routing nodes may be different, but the sleep time sequence of the neighboring node(s) is recorded. In the embodiment of the present invention, the sending of the probe frame may begin at a time near the time at which the neighboring node(s) ends the sleep.

Another manner is to perform enhancement improvement on the solution by using the recorded information about the sleep time sequence of the neighboring node(s). For example, when it is found that active periods of multiple neighboring nodes have an overlapping time period, the probe frame may be sent in the overlapping time period. Assume that the active period of a neighboring node A is recorded as 100 ms-300 ms, and the active period of a neighboring node B is recorded as 200 ms-400 ms. Then, the sending of the probe frame may begin at the time of 200 ms. In another example, when it is found that the time at which multiple neighboring nodes end the sleep is almost the current time, the neighboring nodes may be inquired one by one until the neighboring node with a reasonable cost parameter is selected or until the last neighboring node. In this case, the probe frame may not be sent by using a broadcast, but is sent in a unicast mode. For example, a probe frame may be first sent to the neighboring node A at the time of 100 ms, another probe frame is sent to the neighboring node B at the time of 200 ms, and, before the time of 300 ms, either the neighboring node A or the neighboring node B is selected as the next-hop node to which the data is sent. In another example, when the sending of data is limited to delay requirement and the cost parameter is represented by the hops, a maximum wait time of each hop may be obtained, and the probe frame may be sent in the maximum wait time. For example, if the delay requirement is that the delay of each hop is 1000 ms, the maximum wait time may be less than 1000 ms, and the probe frame may be sent within 500 ms.

202: Notify the neighboring node(s) of a cost parameter stored in a routing table of a sending node.

The cost parameter of the destination node, where the cost parameter of the destination node is stored in the routing table of the sending node, may be carried in the probe frame and sent to the neighboring node(s), or may be sent to the neighboring node(s) through another command.

This step is optional. The cost parameter stored in the routing table of the sending node may also not be notified to the neighboring node(s).

203: Receive a response message returned by the neighboring node(s).

When the neighboring node(s) is in an active period, the neighboring node(s) may receive the foregoing probe frame sent by the sending node, and returns the response message to the sending node if the routing table of the neighboring node(s) includes the address of the destination node, and meanwhile, when the cost parameter stored in the routing table of the sending node is obtained in step 202, and when the cost parameter of the neighboring node(s) is lower than the cost parameter of the destination node, where the cost parameter of the destination node is stored in the routing table of the sending node. The returned response message may include the cost parameter of the neighboring node(s), or may not include the cost parameter of the neighboring node(s).

If step 202 is not executed, the neighboring node(s) may receive the foregoing probe frame sent by the sending node when the neighboring node(s) is in the active period. If the routing table of the neighboring node(s) includes the address of the destination node, the neighboring node(s) returns the response message that includes the cost parameter of the neighboring node(s) to the sending node.

204: Select one neighboring node from the neighboring node(s) that returns the response message as a next-hop node to which data is sent.

A cost parameter of the neighboring node selected as the next-hop node is lower than a cost parameter in the routing table of the destination node, where the routing table of the destination node is stored in a sending node. That is, the data is transmitted along a path with a gradually decreasing cost.

For example, from the neighboring node(s) that returns the response message, where the cost parameter of the neighboring node(s) is lower than the cost parameter in the routing table of the destination node and the routing table of the destination node is stored in the sending node, select a neighboring node that first returns the response message as the next-hop node to which the data is sent; from the neighboring node(s) that returns the response message, where the cost parameter of the neighboring node(s) is lower than the cost parameter in the routing table of to the destination node and the routing table of the destination node is stored in the sending node, randomly select a neighboring node as the next-hop node to which the data is sent. Alternatively, from the neighboring node(s) that returns the response message, where the cost parameter of the neighboring node(s) is lower than the cost parameter in the routing table of the destination node and the routing table of the destination node is stored in the sending node, and meanwhile, a difference between the cost parameter of the neighboring node(s) and the cost parameter in the routing table of the destination node reaches a cost parameter difference threshold and the routing table of the destination node is stored in the sending node, select a neighboring node as the next-hop node to which the data is sent.

Figure 3:
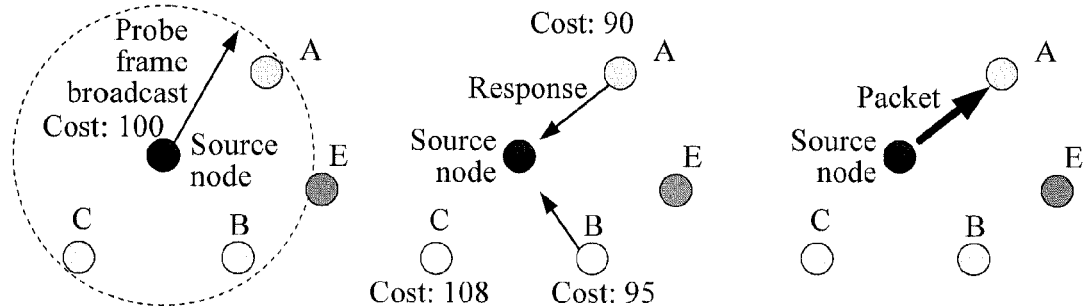
FIG. 3 is a schematic diagram about selecting a next-hop node to which data is sent in a routing method according to an embodiment of the present invention.

If the returned response message carries the cost parameter of the neighboring node(s), from the neighboring node(s) that returns the response message, the neighboring node with the lowest cost parameter may be selected as the next-hop node to which the data is sent. For example, as shown in FIG. 3, the source node needs to send a packet to the destination node. Search the routing table and find that the cost parameter is 100, and therefore, broadcast the probe frame. Neighboring nodes of the source node include A, B, C and E. When the source node broadcasts the probe frame, A, B and C are in an active state and receive the probe frame from the source node, and E is in a sleep state. A, B and C search for their respective routing table respectively, and find a corresponding entry of the destination node respectively. The cost parameters are 90, 95 and 108 respectively. Because the cost parameter of C is higher, C returns no response frame. A and B return a response frame because their cost parameters are lower than 100. The source node receives the response frames from A and B, compares the response frames, selects A with the lowest cost parameter as the next-hop node, and sends the packet to node A. In this way, one hop of data transmission is complete. By using this method, after the multi-hop data transmission, the packet finally arrives at the destination node.

The sending node may preset a period. After the preset period expires, select the next-hop node from the neighboring node(s) that returns the response message in the preset period. In this way, the sending node may collect response messages of more neighboring nodes, and thus, may select the best neighboring node as the next-hop node.

After the next-hop node is selected, the sending node may broadcast a notification to notify the neighboring node selected as the next-hop node, so that neighboring devices that are not selected as the next-hop node continue working according to their work time sequence, for example, enter the sleep state. Certainly, the foregoing notification may not be sent, and the neighboring node may start a timer after returning the response message. If no packet is received within a specific time, it indicates that the neighboring node is not selected as the next-hop node, and the neighboring node continues working according to its work time sequence. If the neighboring node supports monitoring of a miscellaneous mode, the neighboring node may also monitor the sending of packets. If the packet is not sent to the neighboring node, the neighboring node recovers its own work time sequence.

In the embodiment of the present invention, it is unnecessary to specify a specific next-hop address corresponding to each destination node address. Instead, the cost parameter is recorded, and the next-hop path is selected in real time according to the cost parameter. Therefore, during data transmission, it is unnecessary to wait for a specific next-hop node to end the sleep and then send the data. The data may be sent through any neighboring node that first ends the sleep. Therefore, a data transmission delay in the low-power-consumption routing network may be reduced. The shortening of the delay means that the router may shorten the wait time, and reduce the sending of the probe frames, and therefore, reduce power consumption and interference on the outside. Moreover, because each hop has multiple links to select, actually robustness is improved and route repair requirements are reduced.

Figure 4:
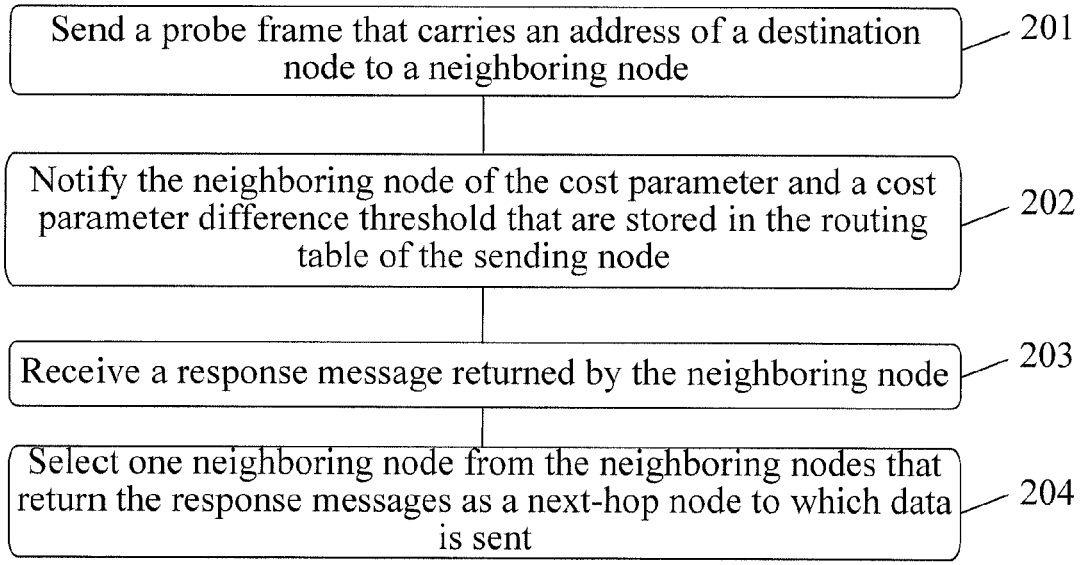
FIG. 4 is a schematic flowchart of another routing method according to an embodiment of the present invention.

FIG. 4 is a schematic flowchart of another routing method according to an embodiment of the present invention. As shown in FIG. 4, the routing method provided in the embodiment of the present invention includes the following steps:

401: Send a probe frame that carries an address of a destination node to a neighboring node(s).

When a source node sends a packet, or when an intermediate routing node receives a packet and needs to further forward the packet, the probe frame may be broadcast to neighboring node(s). In a network that adopts a low-power-consumption routing technique, data may be transmitted between the routing nodes by using an asynchronous mechanism or a quasi-synchronous mechanism. In a wireless network with low-power-consumption routes that adopt the quasi-synchronous mechanism, the sleep time sequence of each routing node may be different, but the sleep time sequence of the neighboring node(s) is recorded. In the embodiment of the present invention, the sending of the probe frames may begin at a time near the time at which the neighboring node(s) ends the sleep. Another manner is to perform enhancement improvement on the solution by using the recorded information about the sleep time sequence of the neighboring node(s). The specific manner may be the same as the previous embodiment, and is not detailed here.

402: Notify the neighboring node(s) of the cost parameter and a cost parameter difference threshold that are stored in the routing table of the sending node.

The cost parameter of the destination node and the cost parameter difference threshold, which are stored in the routing table of the sending node, may be carried in the probe frame and sent to the neighboring node(s), or may be sent to the neighboring node(s) through another command. Certainly, the cost parameter difference threshold may not be carried here; instead, the cost parameter notified to the neighboring node(s) is a cost parameter obtained by subtracting the cost parameter difference threshold from the cost parameter stored in the routing table of the sending node.

403: Receive a response message returned by the neighboring node(s).

When the neighboring node(s) is in an active period, the neighboring node(s) may receive the foregoing probe frame sent by the sending node, and returns the response message to the sending node if the routing table of the neighboring node(s) includes the address of the destination node, and the cost parameter of the neighboring node(s) is lower than the cost parameter of the destination node, where the cost parameter of the destination node is stored in the routing table of the sending node, and meanwhile, when the difference between the cost parameter of the neighboring node(s) and the cost parameter of the destination node, where the cost parameter of the destination node is stored in the routing table of the sending node is higher than the cost parameter difference threshold. The returned response message may include the cost parameter of the neighboring node(s), or may not include the cost parameter of the neighboring node(s).

404: Select one neighboring node from the neighboring node(s) that returns the response message as a next-hop node to which data is sent.

From the neighboring node(s) that returns the response message, select a neighboring node that first returns the response message as the next-hop node to which the data is sent; from the neighboring node(s) that returns the response message, randomly select a neighboring node as the next-hop node to which the data is sent. If the returned response message carries the cost parameter of the neighboring node(s), from the neighboring node(s) that returns the response message, the neighboring node with the lowest cost parameter may be selected as the next-hop node to which the data is sent.

Similarly, the sending node may set a specific period. After the specific period expires, select the next-hop node from the neighboring node(s) that returns the response message in the specific period. In this way, the sending node may collect response messages of more neighboring nodes, and thus, may select the best neighboring node as the next-hop node.

In the embodiment of the present invention, the cost parameter difference threshold is specified, which may avoid selecting a neighboring node whose cost parameter has little difference from the cost parameter of the sending node as the next-hop node, and thus avoid too great delay and power consumption that are caused by too many hops. Meanwhile, in the embodiment of the present invention, it is unnecessary to specify a specific next-hop address corresponding to each destination node address in the routing table. Instead, the cost parameter is recorded, and the next-hop path is selected in real time according to the cost parameter. Therefore, during data transmission, it is unnecessary to wait for a specific next-hop node to end the sleep and then send the data. The data may be sent through any neighboring node that first ends the sleep. Therefore, a data transmission delay in the low-power-consumption routing network may be reduced. The shortening of the delay means that the router may shorten the wait time, and reduce the sending of the probe frames, and therefore, reduce power consumption and interference on the outside. Moreover, because each hop has multiple links to select, actually robustness is improved and route repair requirements are reduced.

Figure 5:
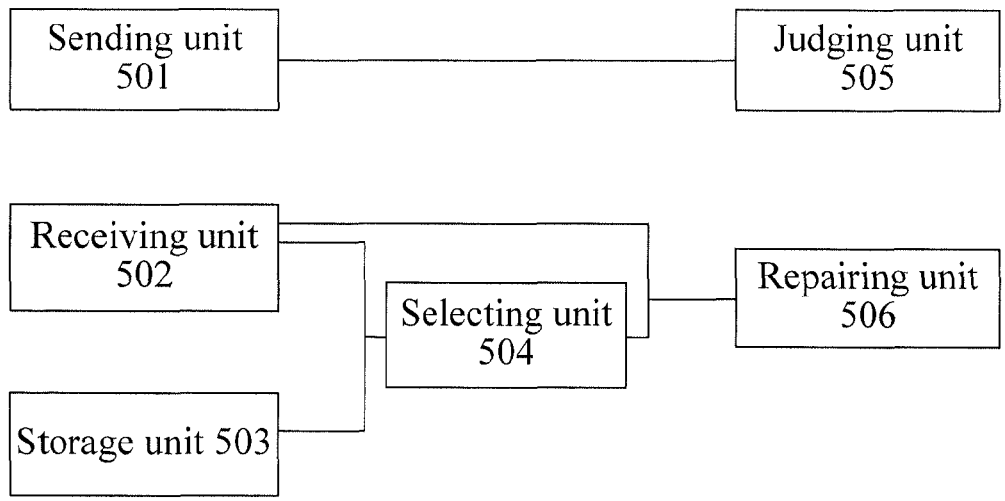
FIG. 5 is a schematic diagram of a communication device according to an embodiment of the present invention.

FIG. 5 is a schematic diagram of a communication device according to an embodiment of the present invention. As shown in FIG. 5, the communication device 500 provided in the embodiment of the present invention includes:

a sending unit 501, configured to send a probe frame that carries an address of a destination node to a neighboring node(s);

a receiving unit 502, configured to receive a response message returned by the neighboring node(s) that receives the probe frame sent by the sending unit 501;

a storage unit 503, configured to store a routing table of the destination node; and a selecting unit 504, configured to; select one neighboring node from the neighboring node(s) that returns the response message as a next-hop node to which data is sent, where a cost parameter of the neighboring node selected as the next-hop node is lower than a cost parameter in the routing table of the destination node, where the routing table of the destination node is stored in the storage unit.

The sending unit 501 is further configured to notify the neighboring node(s) of a cost parameter in the routing table of the destination node, where the routing table of the destination node is stored in the storage unit. In this case, the receiving unit 502 is configured to receive a response message returned by a neighboring node(s), which receives the probe frame, and whose cost parameter is lower than the cost parameter in the routing table of the destination node, where the routing table of the destination node is stored in the sending node.

The sending unit 501 is configured to notify the neighboring node(s) of a cost parameter difference threshold. In this case, the receiving unit 502 is further configured to receive a response message returned by a neighboring node(s), where the neighboring node(s) receives the probe frame, and a difference between the cost parameter of the neighboring node(s) and the cost parameter in the routing table of the destination node, where the routing table of the destination node is stored in the sending node, reaches the cost parameter difference threshold.

In addition, the communication device 500 may further include a judging unit 505. The judging unit 505 is configured to judge whether the routing table of the destination node, where the routing table of the destination node is stored in the storage unit, stores the address of the next-hop node. In this case, the sending unit 501 is configured to send the probe frame that carries the address of the destination node to the neighboring node(s) when the judging unit judges that the routing table of the destination node, where the routing table of the destination node is stored in the storage unit, does not store the address of the next-hop node.

Moreover, the communication device 500 may further include a route repairing unit 506. The route repairing unit is configured to perform route repair when the receiving unit does not receive any response message returned by the neighboring node(s), or the selecting unit cannot select a proper next-hop node.

In the embodiment of the present invention, it is unnecessary to specify a specific next-hop address corresponding to each destination node address in the routing table. Instead, the cost parameter is recorded, and the next-hop path is selected in real time according to the cost parameter. Therefore, during data transmission, it is unnecessary to wait for a specific next-hop node to end the sleep and then send the data. The data may be sent through any neighboring node that first ends the sleep. Therefore, a data transmission delay in the low-power-consumption routing network may be reduced. The shortening of the delay means that the router may shorten the wait time, and reduce the sending of the probe frames, and therefore, reduce power consumption and interference on the outside. Moreover, because each hop has multiple links to select, actually robustness is improved, route repair requirements are reduced, the power consumed in network operation is reduced, and interference is reduced.

Figure 7:
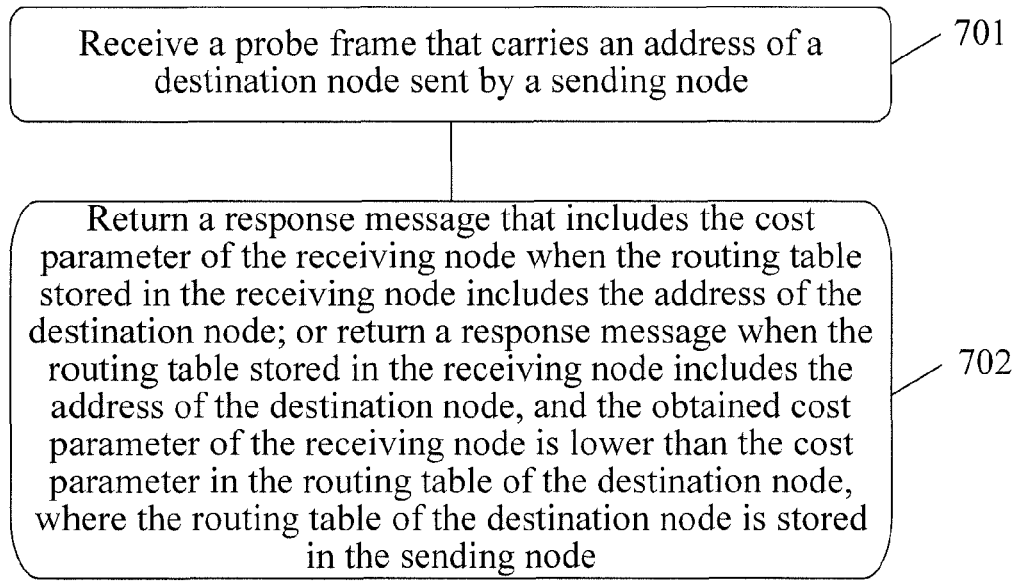
FIG. 7 is a schematic flowchart of another routing method according to an embodiment of the present invention.

FIG. 7 is a schematic flowchart of another routing method according to an embodiment of the present invention. As shown in FIG. 7, the routing method provided in the embodiment of the present invention includes:

701: Receive a probe frame that carries an address of a destination node from a sending node.

702: Return a response message that carries a cost parameter of a receiving node when a routing table stored in the receiving node includes the address of the destination node; or return a response message when the routing table stored in the receiving node includes the address of the destination node, and the obtained cost parameter of the receiving node is lower than the cost parameter in the routing table of the destination node, where the routing table of the destination node is stored in the sending node.

The method in the embodiment of the present invention may further include:

obtaining a cost parameter difference threshold. In this case, the response message is returned when the routing table stored in the receiving node includes the address of the destination node, and a difference between the cost parameter of the receiving node and the cost parameter in the routing table of the destination node, where the routing table of the destination node is stored in the sending node, reaches the cost parameter difference threshold.

In addition, in the embodiment of the present invention, the returned response message may carry the cost parameter of the receiving node.

If the receiving node monitors the probe frame that carries the address of the destination node again after returning the response message, the receiving node waits for a certain time, and then returns the response message again.

If the receiving node does not receive a corresponding packet in a specific time after returning the response message, the receiving node works according to its own time sequence, for example, enters a sleep state; or, the receiving node may wait to receive a broadcast which is sent by the sending node and includes the neighboring node selected as the next-hop node. If the receiving node is not the neighboring node selected as the next-hop node, the receiving node works according to its own time sequence; or, the receiving node monitors the sending of the packet. If the packet is not sent to the receiving node, the receiving node works according to its own time sequence.

In the embodiment of the present invention, it is unnecessary to specify a specific next-hop address corresponding to each destination node address in the routing table. Instead, the cost parameter is recorded, and the next-hop path is selected in real time according to the cost parameter. Therefore, during data transmission, it is unnecessary to wait for a specific next-hop node to end the sleep and then send the data. The data may be sent through any neighboring node that first ends the sleep. Therefore, a data transmission delay in the low-power-consumption routing network may be reduced. The shortening of the delay means that the router may shorten the wait time, and reduce the sending of the probe frames, and therefore, reduce power consumption and interference on the outside.

Figure 8:
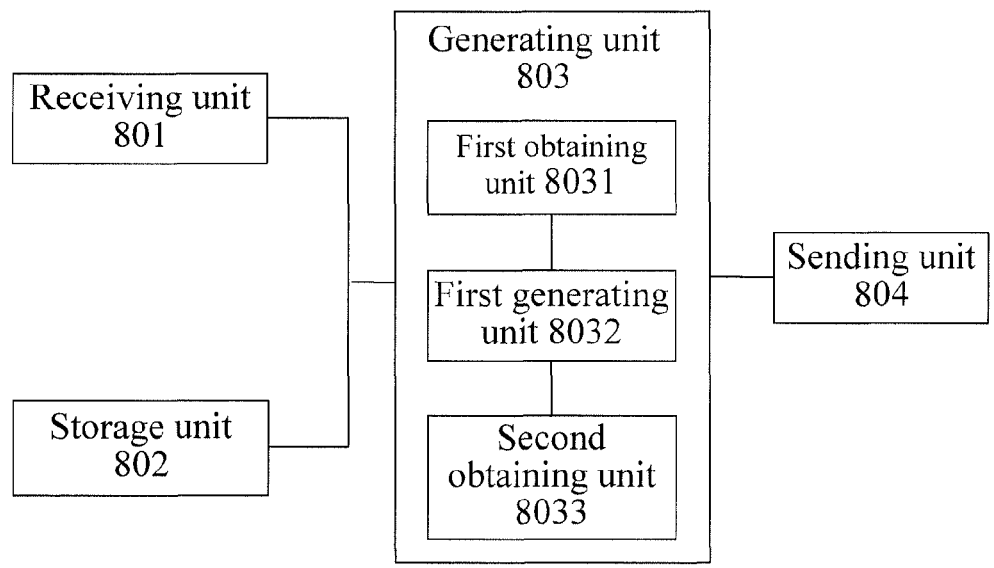
FIG. 8 is a schematic diagram of another communication device according to an embodiment of the present invention.

FIG. 8 is a schematic diagram of another communication device according to an embodiment of the present invention. As shown in FIG. 8, the communication device provided in the embodiment of the present invention includes:

a receiving unit 801, configured to receive a probe frame that carries an address of a destination node sent by a sending node;

a storage unit 802, configured to store a routing table;

a generating unit 803, configured to: generate a response message that carries a cost parameter of a receiving node when the routing table stored in the storage unit 802 includes the address of the destination node, or generate the response message when the routing table stored in the storage unit 802 includes the address of the destination node, and a cost parameter in the routing table stored in the storage unit 802 is lower than an obtained cost parameter in the routing table of the destination node, where the routing table of the destination node is stored in the sending node; and a sending unit 804, configured to send the response message generated by the generating unit.

Further, the generating unit 803 may include: a first obtaining unit 8031, configured to obtain a cost parameter of a next-hop node in the routing table of the destination node, where the routing table of the destination node is stored in the sending node; and a first generating unit 8032, configured to generate a response message when the routing table stored in the storage unit includes the address of the destination node, and the cost parameter in the routing table stored in the storage unit is lower than the obtained cost parameter in the routing table of the destination node, where the routing table of the destination node is stored in the sending node.

The generating unit 803 may further include: a second obtaining unit 8033, configured to obtain a cost parameter difference threshold. In this case, the first generating unit 8032 is configured to generate a response message when the routing table stored in the storage unit includes the address of the destination node, and a difference between the cost parameter in the routing table stored in the storage unit 802 and the cost parameter in the routing table of the destination node, where the routing table of the destination node is stored in the sending node, reaches the cost parameter threshold.

In the embodiment of the present invention, it is unnecessary to specify a specific next-hop address corresponding to each destination node address in the routing table. Instead, the cost parameter is recorded, and the next-hop path is selected in real time according to the cost parameter. Therefore, during data transmission, it is unnecessary to wait for a specific next-hop node to end the sleep and then send the data. The data may be sent through any neighboring node that first ends the sleep. Therefore, a data transmission delay in the low-power-consumption routing network may be reduced. The shortening of the delay means that the router may shorten the wait time, and reduce the sending of the probe frames, and therefore, reduce power consumption and interference on the outside. Moreover, because each hop has multiple links to select, actually robustness is improved, route repair requirements are reduced, the power consumed in network operation is reduced, and interference is reduced.

Figure 6:
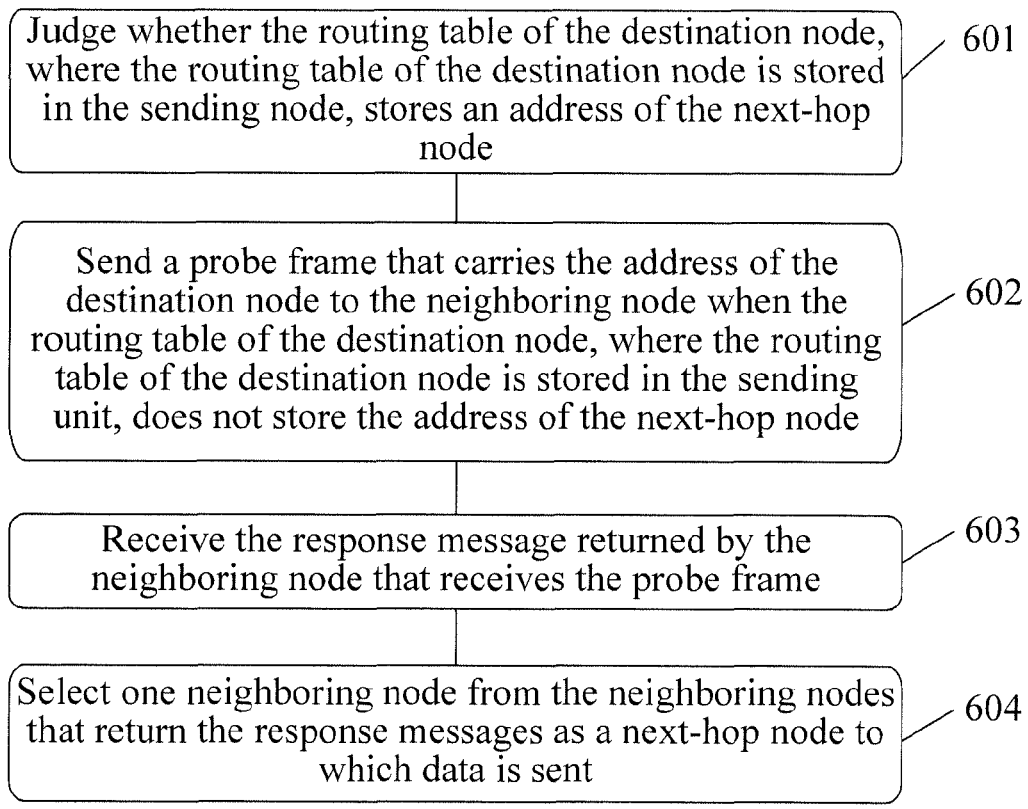
FIG. 6 is a schematic flowchart of another routing method according to an embodiment of the present invention.

FIG. 6 is a schematic flowchart of another routing method according to an embodiment of the present invention. As shown in FIG. 6, the routing method provided in the embodiment of the present invention includes:

601: Judge whether the routing table of the destination node, where the routing table of the destination node is stored in the sending node, stores the address of the next-hop node.

In a network, an ordinary router may be deployed, and the communication devices provided in the embodiments of the present invention may be used as routing nodes. When the ordinary router is a general non-low-power-consumption router, the non-low-power-consumption router does not fall into sleep periodically, but is always in an active state. Therefore, data may be sent to the non-low-power-consumption router directly, without using the method of sending a probe frame. In the route discovery process, if the next-hop node is a general non-low-power-consumption router, the address of the next-hop router may be recorded instead of recording the cost parameter. A flag may be added into the routing table entry to distinguish between the two different recordings, where the flag indicates what is recorded is the next-hop address or the cost parameter. During addressing, if searching the routing table and finding that what is recorded is the next-hop address, send the packet to the specific routing node directly; if the next-hop address is not recorded in the routing table, the packet is sent according to the routing manner according to the embodiments of the present invention. For the data sent by the general non-low-power-consumption router, the data is transmitted according to the routing method in the prior art. If the ordinary router is a low-power-consumption router in the prior art, when sending data to the low-power-consumption router in the prior art, the processing method is similar to the processing method of sending data to the non-low-power-consumption router described above. By using the method in the prior art, send the data to the low-power-consumption routing node directly when the low-power-consumption routing node wakes up.

To identify whether the neighboring node is an ordinary router or a communication device, where the communication device is provided in the embodiments of the present invention and used as a routing node, a flag bit may be added into a routing request or routing response command during route discovery. For example, if the routing request or routing response command is forwarded by the communication device provided in the embodiments of the present invention, perform marking by using the flag bit. Then, the neighboring node knows that the sending node is a communication device provided in the embodiments of the present invention after receiving the command.

602: Send a probe frame that carries the address of the destination node to the neighboring node(s) when the routing table of the destination node, where the routing table of the destination node is stored in the sending node, does not store the address of the next-hop node.

603: Receive the response message returned by the neighboring node(s) that receives the probe frame.

After the neighboring node(s) receives the foregoing probe frame, if the routing table of the neighboring node(s) includes the address of the destination node, the neighboring node(s) returns the response message.

604: Select one neighboring node from the neighboring node(s) that returns the response message as a next-hop node to which data is sent.

A cost parameter of the neighboring node selected as the next-hop node is lower than a cost parameter in the routing table of the destination node, where the routing table of the destination node is stored in a sending node. That is, the data is transmitted along a path with a gradually decreasing cost.

In the embodiment of the present invention, after judging whether the routing table of the destination node, where the routing table of the destination node is stored in the sending node, stores the address of the next-hop node, the applied routing method may be any routing method according to the embodiments of the present invention, and is not detailed here.

Similarly, in the embodiment of the present invention, it is unnecessary to specify a specific next-hop address corresponding to each destination node address in the routing table. Instead, the cost parameter is recorded, and the next-hop path is selected in real time according to the cost parameter. Therefore, during data transmission, it is unnecessary to wait for a specific next-hop node to end the sleep and then send the data. The data may be sent through any neighboring node that first ends the sleep. Therefore, a data transmission delay in the low-power-consumption routing network may be reduced. The shortening of the delay means that the router may shorten the wait time, and reduce the sending of the probe frames, and therefore, reduce power consumption and interference on the outside. Moreover, because each hop has multiple links to select, actually robustness is improved and route repair requirements are reduced.

By using the routing method according to the embodiments of the present invention, the cost parameter corresponding to each destination node is recorded in the routing table, and the next-hop path is selected in real time according to the cost parameter. Because each hop may have multiple links to select, multiple paths to the destination node is formed. Even if one of the neighboring nodes or one of the links fails, the connectivity of the entire path is not affected, and the data may be sent through the link of another neighboring node. In this case, the occasion of performing route repair differs from that of the prior art. Specifically, repair may be performed after it is found that all neighboring nodes cannot meet the conditions of data forwarding. That is, after the sending node sends the probe frame, if the sending node receives no response message sent by any neighboring node within a preset period, the sending node should initiate route repair, or sends a network state command to the source node or destination node to notify the source node or the destination node of performing route repair. The route repair method may be performing route discovery again. The preset period here may be determined according to the sleep time of the neighboring node. For example, if the duration of sending probe frames exceeds the maximum sleep time, there should be a neighboring node(s) that receives the probe frame and returns a response message if there is no conflict, interference or fault. Taking possible conflict or interference into consideration, the duration may be a multiple of the maximum sleep time. Another scenario of initiating route repair is that: Although the response is received, no proper route is selected, for example, due to too small cost difference. Therefore, repair is performed, and the route discovery is performed again.

Persons of ordinary skill in the art should understand that all or part of the steps of the foregoing method embodiments may be implemented by a program instructing relevant hardware. The foregoing program may be stored in a computer readable storage medium. When the program is executed, the steps of the foregoing method embodiments are executed. The foregoing storage medium may be any medium capable of storing program codes, including a ROM, a RAM, a magnetic disk, or a CD-ROM.

Finally, it should be noted that the preceding embodiments are merely used to describe the technical solutions of the present invention, but are not intended to limit the technical solutions of the present invention. Although the present invention is described in detail with reference to the preceding embodiments, it should be understandable that: persons of ordinary skill in the art may still make various modifications to the technical solutions recorded in the preceding embodiments, or make equivalent replacements to part of the technical features in the technical solutions recorded in the preceding embodiments. However, there modifications or replacements do not make the nature of the corresponding technical solutions deviate from the spirit and scope of the technical solutions according to the embodiments of the present invention.

What is claimed is:

1. A routing method, comprising:
    performing, by a communication device:
        sending, by a sending node, a cost probe frame to a neighboring node(s) in a case:
            data is to be sent by the sending node to a destination node, and
            a routing table of the sending node stores an address of the destination node and does not store an address of a next-hop neighboring node(s) for the destination node,
            the cost probe frame carries the address of the destination node stored in the routing table of the sending node;
        obtaining, by the sending node, a cost parameter(s) of the neighboring node(s) returned by the neighboring node(s), in response to the cost probe frame for the destination node stored in the routing table of the sending node;
        selecting, by the sending node, a next-hop neighboring node from among the neighboring node(s) that returns the cost parameter(s), according to a cost parameter of the next-hop neighboring node being lower than a cost parameter for the destination node stored in the routing table of the sending node; and
        sending, by the sending node, the data to the selected next-hop neighboring node.

2. The method according to claim 1, wherein the communication device further performs:
    judging, according to a flag bit in the routing table of the sending node, whether the address of the next-hop neighboring node for the destination node is stored in the routing table of the sending node.

3. The method according to claim 1, wherein the communication device further performs:
    notifying the neighboring node(s) of a cost parameter for the destination node stored in the routing table of the sending node; and
    receiving response message(s) returned by the neighboring that have a cost parameter lower than the cost parameter for the destination node stored in the routing table of the sending node;
    the selecting the next-hop neighboring node comprises:
    in a case the returned response message(s) carries the cost parameter of the neighboring node(s):
        selecting a neighboring node from among the neighboring node(s) with lowest cost parameter as the next-hop neighboring node to which the data is sent; or
        selecting a neighboring node that first returns a response message as the next-hop neighboring node to which the data is sent; or
        in a case a difference between a cost parameter of a neighboring node and the cost parameter for the destination node stored in the routing table of the sending node reaches a cost parameter difference threshold, selecting the neighboring node as the next-hop neighboring node to which the data is sent; or
        randomly selecting a neighboring node as the next-hop neighboring node to which the data is sent.

4. The method according to claim 3, wherein the communication device further performs:
    to select the next-hop neighboring node according to the cost parameter difference threshold, notifying the neighboring node(s) of the cost parameter difference threshold.

5. The method according to claim 1, wherein the communication device further performs:
    notifying the neighboring node(s) that is not selected as the next-hop neighboring node and returning the response message(s) including information about the neighboring node selected as the next-hop neighboring node.

6. The method according to claim 1, wherein the communication device further performs:
    setting time of receiving the cost parameter(s) returned by the neighboring node(s); and
    the selecting the next-hop neighboring node comprises:
    after the time of receiving the cost parameter(s) returned by the neighboring node(s) expires, from the neighboring node(s) that returns the cost parameter(s), selecting a neighboring node as the next-hop neighboring node to which the data is sent.

7. The method according to claim 1, wherein the communication device further comprises:
    in a case no cost parameter(s) is received from any of the neighboring node(s), or no next-hop neighboring node is selectable, performing route repair.

8. A routing method, comprising:
performing, by a communication device configured to implement a receiving node:
receiving from a sending node in a case the sending node determines whether to select the receiving node as a next hop neighboring node for sending data to a destination node stored in a routing table of the sending node and the routing table of the sending node does not store an address of a next-hop neighboring node(s) for the destination node, a cost probe frame which carries the destination address of the destination node stored in the routing table of the sending node ;and
in response to the cost probe frame, returning a response message in a case a routing table stored in the receiving node stores the address of the destination node, the response message carries a cost parameter of the receiving node,
to thereby cause the sending node to select the receiving node as the next hop neighboring node when the cost parameter of the receiving node stored in the routing table of the receiving node is lower than a cost parameter for the destination node stored in the routing table of the sending node.

9. The method according to claim 8, wherein the communication device further performs:
obtaining a cost parameter difference threshold; and
the response message is returned in a case the address of the destination node is stored in the routing table of the receiving node and a difference between the cost parameter of the receiving node and the cost parameter for the destination node stored in the routing table of the sending node reaches the cost parameter difference threshold.

10. The method according to claim 8, wherein the communication device further performs:
waiting for a time and then returning the response message again in a case the cost probe frame that carries the address of the destination node is received again.

11. The method according to claim 8, wherein the communication device further performs:
working according to a local time sequence in a case no corresponding packet to the cost probe frame is received within a preset time after the response message is returned; or
working according to the local time sequence in a case the receiving node is not a neighboring node selected as a next-hop neighboring node after receiving a broadcast which is sent by the sending node and carries information about the neighboring node selected as the next-hop neighboring node; or
monitoring the sending of packets, and working according to the local time sequence in a case the corresponding packet to the cost probe frame is not sent to the receiving node.

12. The routing method according to claim 8, wherein the communication device further performs:
obtaining a cost parameter of a next-hop neighboring node for the destination node stored in the routing table of the sending node; and
the response message is returned in a case the address of the destination node is stored in the routing table of the receiving node and the cost parameter of the receiving node is lower than the cost parameter for the destination node stored in the routing table of the sending node.

13. A communication device configured to implement a sending node function, the communication device comprising:
non-transitory computer readable storage medium to store program(s), and
computer hardware configured, including configured by the program(s), to:
send, a cost probe frame to a neighboring node(s) in a case:
data is to be sent to a destination node, and
a routing table of the sending node stores an address of the destination node and does not store an address of a next-hop neighboring node(s) for the destination node,
the cost probe frame carries the address of the destination node stored in the routing table of the sending node;
obtain a cost parameter(s) of the neighboring node(s) returned by the neighboring node(s), in response to the cost probe frame for the destination node stored in the routing table of the sending node; and
select a next-hop neighboring node from among the neighboring node(s) that returns the cost parameter(s), according to a cost parameter of the next-hop neighboring node being lower than a cost parameter for the destination node stored in the routing table of the sending node.

14. The communication device according to claim 13, wherein the computer hardware is further configured to:
notify the neighboring node(s) of a cost parameter for the destination node stored in the routing table of the sending node; and
receive response message(s) returned by the neighboring node(s) that have a cost parameter lower than the cost parameter for the destination node stored in the routing table of the sending node,
the selecting the next-hop neighboring node comprises:
in a case the returned response message(s) carries the cost parameter of the neighboring node(s):
selecting a neighboring node from among the neighboring node(s) with lowest cost parameter as the next-hop neighboring node to which the data is sent; or
selecting a neighboring node that first returns a response message as the next-hop neighboring node to which the data is sent; or
in a case a difference between a cost parameter of a neighboring node and the cost parameter for the destination node stored in the routing table of the sending node reaches a cost parameter difference threshold, selecting the neighboring node as the next-hop neighboring node to which the data is sent; or
randomly selecting a neighboring node as the next-hop neighboring node to which the data is sent.

15. The communication device according to claim 14, wherein to select the next-hop neighboring node according to the cost parameter difference threshold, the computer hardware is further configured to:
notify the neighboring node(s) of the cost parameter difference threshold.

16. The communication device according to claim 13, wherein the computer hardware is further configured to:
perform route repair in a case no cost parameter(s) is received from the neighboring node(s), or no next-hop neighboring node is selectable.

17. A communication device configured to implement a receiving node function, the communication device comprising:
non-transitory computer readable storage medium to store program(s), and computer hardware configured, including configured by the program(s), to:

receive, from a sending node in a case the sending node determines whether to select the receiving node as a next hop neighboring node for sending data to a destination node stored in a routing table of the sending node and the routing table of the sending node does not store an address of a next-hop neighboring node(s) for the destination node, a cost probe frame which carries the destination address of the destination node stored in the routing table of the sending node;

store a routing table for the receiving node;

in response to the cost probe frame, generate a response message in a case the routing table of the receiving node stores the address of the destination node, the response message carries a cost parameter of the receiving node, to thereby cause the sending node to select the receiving node as the next hop neighboring node when the cost parameter of the receiving node stored in the routing table of the receiving node is lower than a cost parameter for the destination node stored in the routing table of the sending node, and send, to the sending node, the response message.

18. The communication device according to claim 17, wherein the computer hardware is further configured to:

obtain a cost parameter of a next-hop neighboring node for the destination node stored in the routing table of the sending node; and the response message is returned in a case the address of the destination node is stored in the routing table of the receiving node and the cost parameter of the receiving node is lower than the cost parameter for the destination node stored in the routing table of the sending node.

19. The communication device according to claim 18, wherein the computer hardware is further configured to:

obtain a cost parameter difference threshold;

the response message is returned in a case the address of the destination node is stored in the routing table of the receiving node and a difference between the cost parameter in the routing table of the receiving node and the cost parameter for the destination node stored in the routing table of the sending node reaches the cost parameter difference threshold.

\* \* \* \* \*